Nov. 11, 1969    D. W. WINKLER, JR    3,477,609
PLASTIC BOX HAVING SNAP COVER WITH SEAL
Filed Oct. 24, 1968
FIG. 1
FIG. 3
FIG. 2
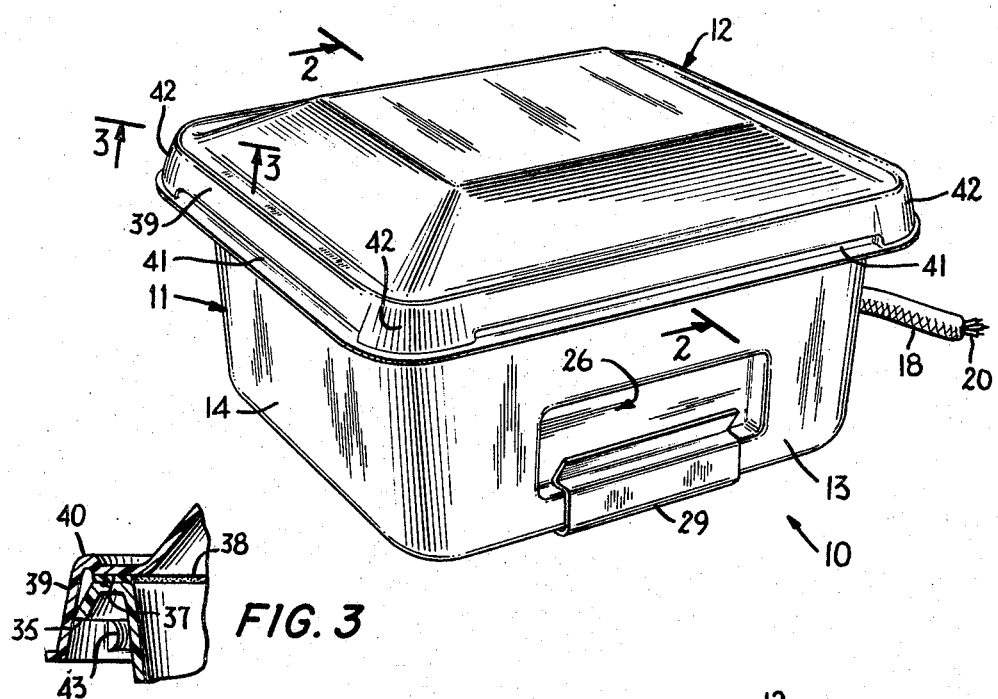
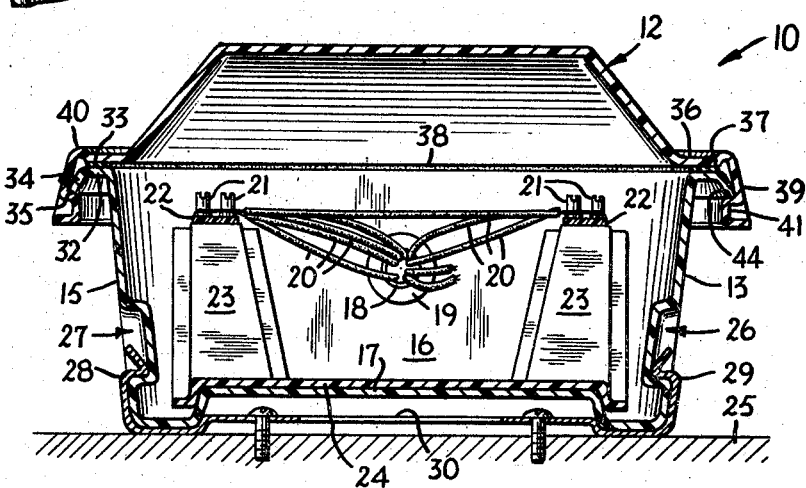
INVENTOR.
DAVID WINKLER, JR.
BY
his ATTORNEYS

United States Patent Office 3,477,609
Patented Nov. 11, 1969

3,477,609
PLASTIC BOX HAVING SNAP COVER WITH SEAL
David W. Winkler, Jr., Groton, Conn., assignor to General Dynamics Corporation, New York, N.Y., a corporation of Delaware
Filed Oct. 24, 1968, Ser. No. 770,143
Int. Cl. B65d *43/10, 53/04;* H01r *13/46*
U.S. Cl. 220—60      5 Claims

ABSTRACT OF THE DISCLOSURE

In the particular embodiment of the invention described herein an electrical terminal box comprises a plastic body and a plastic cover having complementary mating surfaces gasketed to form a hermetic seal and complementary rim configurations locking the body and cover together outside the seal.

---

BACKGROUND OF THE INVENTION

This invention relates to enclosures made of plastic material, such as plastic terminal boxes and the like and, more particularly, to a new and improved plastic terminal box which is strong and inexpensive and forms a hermetically tight seal.

In environments where electrical terminals must be sealed off from the surrounding atmosphere, such as on ships and aircraft, it has been practice to provide sealed terminal boxes made of metals such as brass. Such terminal boxes are not only bulky and unnecessarily heavy, but are also expensive to make and utilize materials which may be in short supply. Heretofore no plastic boxes have been satisfactory for this purpose because they have not had sufficient strength and rigidity and have not provided dependable sealing. Plastic boxes of the type described in the patent to Gray, No. 3,193,132, for example, are unsatisfactory for the purpose because there is insufficient interengagement between the box and cover members to assure hermetic sealing of the enclosure.

Accordingly, it is an object of the present invention to provide a plastic terminal box which overcomes the above-mentioned disadvantages of the prior art.

It is another object of this invention to provide a lightweight, inexpensive terminal box providing a hermetic seal between the body and the cover of the box.

BRIEF SUMMARY OF THE INVENTION

These and other objects of the present invention are accomplished by providing body and cover members which are made of plastic material and have gasketed mating peripheral portions, and cooperating locking elements on the body and cover members including a rim portion on one member substantially surrounding the engaging peripheral portions extending outwardly from the member and in a direction away from the engaging peripheral portions along with a rim portion on the other member surrounding the rim portion of the first member and having an inwardly projecting lip portion engageable with the edge of the rim portion of the first member. In a preferred embodiment of the invention the rim portion of the second member includes a ridge portion projecting in the opposite direction from the rim to add resilience of the rim, and thereby, facilitate hermetic sealing of the members. To provide cover and body members having substantially uniform wall thickness throughout, those members are preferably made by deep drawing of sheet plastic material.

BRIEF DESCRIPTION OF THE DRAWINGS

In the accompanying drawings:

FIGURE 1 is a perspective view illustrating a typical plastic terminal box arranged according to the present invention;

FIGURE 2 is a cross-sectional view of the terminal box taken along the line 2—2 of FIGURE 1, and looking in the direction of the arrows; and FIGURE 3 is an enlarged fragmentary view taken along line 3—3 of FIGURE 1, and showing a modified form of the corner structure for the terminal box.

DESCRIPTION OF THE PREFERRED EMBODIMENT

In the illustrative embodiment of the invention shown in FIGURES 1 and 2, a rigid box 10, comprising a body 11 and a cover 12, includes four side walls 13, 14, 15 and 16 and a bottom wall 17. As best seen in FIGURE 2, a cable 18 is received through a sealed opening 19 in the side wall 16 and the conductors 20 of the cable extend to rows of corresponding terminals 21 mounted on plastic support plates 22 at opposite sides of the box. The plates 22 are affixed to plastic support brackets 23 integral with and extending upwardly from a plastic base plate 24 which conforms to and is plastically welded to the inner surface of the bottom wall 17 of the box body. To mount the box on a base plate 25, the side walls 13 and 15 are formed with centrally located recesses 26 and 27, respectively, which receive the correspondingly shaped ends 28 and 29 of a metal clip 30 mounted on the base plate.

As best seen in FIGURES 2 and 3, the side walls 13, 14, 15 and 16 terminate at their upper extremity in a peripheral flange 32 having a flat surface portion 33 extending entirely around the periphery of the box body 11 and having a rim 34 extending downwardly from the surface and away from the cover 12 to a terminal edge 35. In order to cooperate with the gasket 38 and rim 34 so as to lock the cover 12 in hermetically sealed relation to the body 11, the cover includes a peripheral flange 36 formed with a flat surface portion 37 which mates with the corresponding portion 33 of the body. A compressible rubber gasket 38 is affixed to the surface 37 around the entire periphery of the box body. To cooperate with the rim 34 of the body to lock the two members together, a rim 39 extending downwardly beyond the mating surface portions about the rim 34 is connected to the flange 36 through an upturned ridge 40. Along each side of the cover the cover rim 39 is formed with an inwardly projecting lip 41, leaving gaps between the lips 41 at the corners 42 of the cover. Removal of the cover is facilitated by forming the lips 41 with rounded ends 43, as shown in FIGURE 3.

In order to assure compression of the gasket 38 sufficiently to produce a hermetical seal around the entire periphery of the mating surfaces, the distance between the lower surface of the gasket 38 and the upper surface 44 of the lips is less than the distance between the mating surface 33 of the body and the lower edge 35 of the body rim. In this connection the slight resilence of the cover rim provided by the presence of the upturned ridge 40 permits the members to be properly locked together and assures complete sealing despite tolerance variations in the rim components. The limited resilience provided by the ridge 40 further faciliates the slight lateral distortion of the rim 39 which is required to permit the lips 41 to pass over the body rim 34 when the cover member is being attached to the body member.

The cover and body members 11 and 12 are preferably formed so that the plastic material of which they are made has substantially uniform thickness throughout, thereby assuring the necessary strength and rigidity of the members without waste of material or loss of usuable space. To produce such members conveniently, they are preferably deep drawn from sheet plastic material which has been softened slightly by heating prior to the drawing operation. In the completed members, the wall thickness is preferably in the range from about one-sixteenth inch to one-eighth inch throughout, although portions in the regions where the material is drawn to the greatest extent, such as in the lips 41, may be somewhat thinner. Any conventional plastic material having the necessary strength and rigidity and forming characteristics may be used such as, for example, a phenolic resin material.

When the cover member 12 is pressed downwardly on the body member 11 so that the lips 41 snap over the body rim 34, the gasket 38 must be compressed around the entire periphery of the mating surfaces in order for the surfaces 44 of the lips to engage the edg 35 of the body rim because of the dimensional relationships described above. Accordingly, a positive and secure hermetic seal is formed between the body and the cover which can only be broken by carrying out the specific steps required for cover removal. It will be apparent that the cover cannot be separated accidentally or unintentionally from the body since any force applied to the outside of the cover in the downward or lateral direction only serves to reinforce the locking action of the rim portions. To remove the cover it is necessary to pry the cover rim 39 outwardly at one corner 42, distorting the cover sufficiently to permit the adjacent rounded ends 43 of the locking lips 41 to pass over the body rim 34. After one corner of the cover has been disengaged in that manner, a similar operation at an adjacent corner will release the cover from the body.

Although the invention has been described herein with reference to a specific embodiment, many modifications and variations therein will readily occur to those skilled in the art. Accordingly, all such variations and modifications are included within the intended scope of the invention as defined by the following claims.

I claim:

1. A plastic box comprising a plastic body member and a plastic cover member having mating surface portions extending entirely about adjacent peripheral portions of the members when joined so as to form a box-like enclosure, a gasket mounted on the mating surface portion of one of the members about the entire periphery thereof so as to form a hermetical seal for the box when the mating surface portions of the body member and the cover member are forcibly urged together, and cooperating locking rims means on the body member and the cover member forcibly urging the mating surface portions together including first rim portion on the first one of the members projecting outwardly from the mating surface portion thereof and extending in a direction opposite the second member from the plane of the mating surfaces when the members are joined, a second rim portion on the second member projecting outwardly from the mating surface thereof and extending in a direction opposite the second member from the plane of the mating surfaces and outwardly from the first rim portion, and at least one lip portion extending inwardly from the second rim portion at a location spaced from the plane of the mating surface portions to engage the terminal edge of the first rim portion and thereby forcibly urge the mating surface portions of the members together.

2. A plastic box according to claim 1 wherein the second rim portion is attached to the mating surface portions of the second member by an oppositely directed ridge portion to impart limited flexibility to the second rim portion.

3. A plastic box according to claim 1 including a plurality of lip portions on the second rim portion, each lip portion being rounded at both ends.

4. A plastic box according to claim 1 wherein the plastic material comprising the body and cover members has substantially uniform thickness throughout each member.

5. A plastic box according to claim 1 wherein the distance from the mating surface of the second member to the lip portion is less than the sum of the thickness of the gasket and the distance from the mating surface of the first member to the edge of the first rim portion.

References Cited

UNITED STATES PATENTS

| | | | |
|---|---|---|---|
| 3,077,284 | 2/1963 | McLaughlin | 220—60 |
| 3,106,602 | 10/1963 | Hartz | 174—60 |
| 3,193,132 | 7/1965 | Fray | 220—60 |

GEORGE T. HALL, Primary Examiner

U.S. Cl. X.R.

220—46; 174—60